United States Patent
Bryan-Brown et al.

(10) Patent No.: US 6,549,256 B1
(45) Date of Patent: Apr. 15, 2003

(54) LIQUID CRYSTAL DEVICE

(75) Inventors: Guy P Bryan-Brown, Malvern (GB); Carl V Brown, Malvern (GB); Ian C Sage, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/117,705

(22) PCT Filed: Apr. 14, 1997

(86) PCT No.: PCT/GB97/01019
§ 371 (c)(1),
(2), (4) Date: Aug. 4, 1998

(87) PCT Pub. No.: WO97/39382
PCT Pub. Date: Oct. 23, 1997

(30) Foreign Application Priority Data

Apr. 16, 1996 (GB) ............................................. 9607854

(51) Int. Cl.[7] ......................... G02F 1/1337; G02F 1/139
(52) U.S. Cl. ........................ 349/128; 349/129; 349/130; 349/132; 349/178; 349/179
(58) Field of Search .......................... 349/128, 96, 165, 349/178, 129, 130, 132, 179

(56) References Cited

U.S. PATENT DOCUMENTS

| | | | | |
|---|---|---|---|---|
| 5,638,201 A | * | 6/1997 | Bos et al. ................ | 349/129 |
| 5,701,168 A | * | 12/1997 | Patel ........................... | 349/130 |
| 5,754,264 A | * | 5/1998 | Bryan-Brown et al. ..... | 349/123 |
| 5,796,459 A | * | 8/1998 | Bryan-Brown et al. ..... | 349/132 |

FOREIGN PATENT DOCUMENTS

| | | |
|---|---|---|
| EP | 0 433 999 | 6/1991 |
| WO | WO 95/00879 | 1/1995 |

* cited by examiner

Primary Examiner—Robert H. Kim
Assistant Examiner—Tai Duong
(74) Attorney, Agent, or Firm—Nixon & Vanderhye P.C.

(57) ABSTRACT

A liquid crystal device comprises a layer of nematic or long pitch cholesteric liquid crystal material contained between two cell walls. One wall (A) carries a surface treatment giving a first azimuthal alignment direction with or without a surface pretilt to liquid crystal molecules. The other wall (B) carries a surface treatment (17) capable of separately providing both a preferred, substantially homeotropic alignment of the adjacent liquid crystal, and a defined azimuthal second alignment direction to the adjacent liquid crystal dependent upon liquid crystal molecular arrangement. The first and second alignment directions are approximately orthogonal. Polarisers may be arranged on either side of the cell walls with their polarisation axes parallel or perpendicular to the two azimuthal directions. Alternatively an amount of dichroic dye may be incorporated in the liquid crystal material, and the device operated with one or two polarisers. The device operates between two different voltage levels, one level providing a non twisted liquid crystal molecular arrangement, the other and higher voltage providing a twisted molecular arrangement.

14 Claims, 6 Drawing Sheets

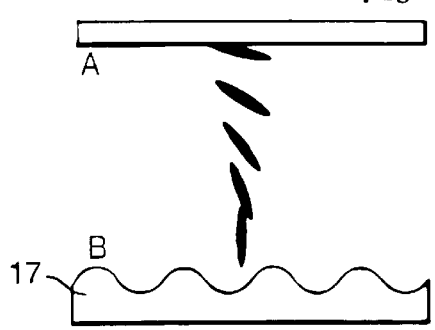
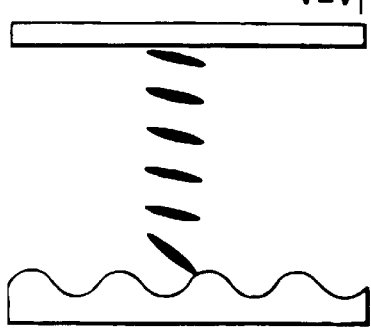
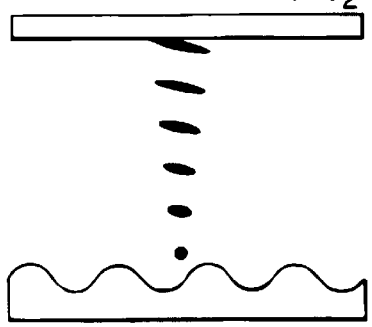
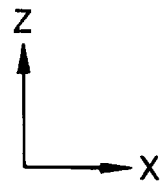
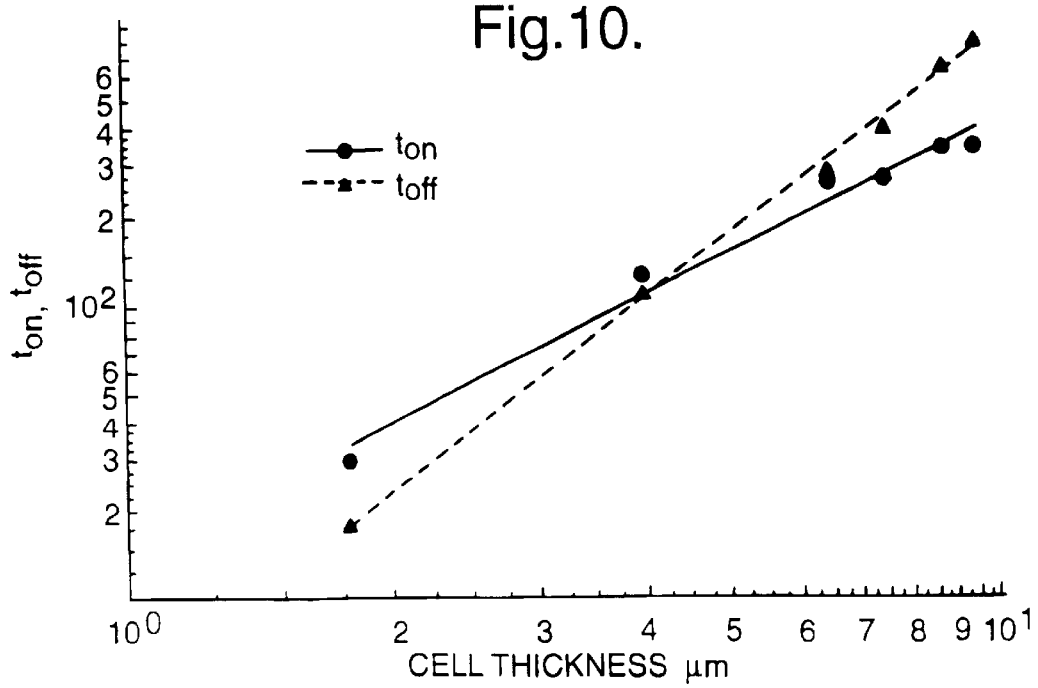

LIQUID CRYSTAL DEVICE

BACKGROUND OF THE INVENTION

1. Field of the Invention

This invention relates to the alignment and switching of nematic liquid crystal devices.

2. Discussion of Prior Art

This invention relates to the alignment and switching of nematic liquid crystal devices.

Liquid crystal devices typically comprise of a thin layer of a liquid crystal material contained between cell walls. Optically transparent electrode structures on the walls allow an electric field to be applied across the layer causing a re-ordering of the liquid crystal molecules.

There are three known types of liquid crystal material nematic, cholesteric and smectic each having different molecular ordering. The present invention concerns devices using nematic materials.

In order to provide displays with a large number of addressable elements it is common to make the electrodes as a series of row electrodes on one wall and a series of column electrodes on the other cell wall. These form e.g. an x,y matrix of addressable elements or pixels and for twisted nematic types of device are commonly addressed using rms. addressing methods.

Twisted nematic and phase change devices are switched to an ON state by application of a suitable voltage and allowed to switch to an OFF state when the applied voltage falls below a lower voltage level, i.e. these devices are monostable. For a twisted nematic type of device (90° or 270° twist as in U.S. Pat. No. 4,596,446) the number of elements that can be rms. addressed is limited by the steepness of a device transmission verses voltage curve (as described by Alt and Pleschko in IEEE Trans ED vol ED 21, (1974) P.146–155).

One way of improving the number of pixels is to incorporate thin film transistors adjacent to each pixel; such displays are termed active switching element and include switching-elements such active matrix displays.

An advantage of nematic types of devices is the relatively low voltage requirements. They are also mechanically stable and have a wide temperature operating range. This allows construction of small and portable battery powered displays.

The main disadvantages of the above devices are as follows. The 90° twisted nematic has a poor viewing characteristic which leads to loss of contrast when the device is viewed at high incident angles in certain azimuthal directions. Furthermore greyscale inversion occurs in these orientations. The low steepness of the 90° twisted nematic can be improved by increasing the twist angle to 180°–270°. However this generally leads to no improvement in viewing characteristic. Both types of device also suffer from the fact that the large difference in the nematic tilt between the on and off states leads to a change in pixel capacitance which can cause crosstalk problems

SUMMARY OF THE INVENTION

According to this invention the above disadvantages are overcome using a surface treatment on one cell wall which treatment consists of an azimuthal alignment direction in a material or coated material which ordinarily induces a homeotropic orientation of the nematic director together with an alignment treatment on the other cell wall giving homogeneous alignment; the liquid crystal material has a negative dielectric anisotropy. This device may be called a VCT (voltage controlled twist device) configuration. It allows a steep optical response to be obtained with a greatly improved viewing characteristic. Furthermore only a small change in pixel capacitance occurs when the pixel is switched which leads to improved active matrix addressing and also less crosstalk in rms. addressing.

According to this invention a liquid crystal device comprises;

a nematic or chiral nematic liquid crystal of negative dielectric anisotropy two containing walls, spaced apart and each so treated as to align the liquid crystal adjacent to them and carrying electrodes or other means to impose a field on the liquid crystal layer;

means for distinguishing between two different optical states;

Characterized by:

an aligning surface treatment at one cell wall providing a substantially planar or tilted alignment of the liquid crystal with a defined azimuthal first alignment direction;

an aligning surface treatment on the second cell wall capable of separately providing both a preferred, substantially homeotropic alignment of the adjacent liquid crystal, and a defined azimuthal second alignment direction to the adjacent liquid crystal dependant upon liquid crystal molecular arrangement;

the first and second azimuthal alignment directions being at a non zero angle to one another;

the arrangement being such that the liquid crystal material may adopt a twisted and a substantially non twisted molecular arrangement dependant upon applied electric fields.

The first and second azimuthal alignment directions may be substantially perpendicular or within 10° of perpendicular. The polarisers optical axis may be orthogonal, or within about 10° of being orthogonal. Additionally, the two polarisers may be rotated relative to the cell to obtain maximum contrast between the two states of the device.

The alignment at said second cell wall may comprise an alignment treatment ordinarily providing homeotropic alignment, in conjunction with a relief grating structure. The grating may be symmetric or asymmetric in profile, the groove depth and or pitch may be constant or may vary between pixels or within one pixel. Furthermore the grating groove direction may be constant or may vary between pixels or within one pixel. The grating surface may contain more than one modulation.

The alignment at said second cell wall may comprise an alignment treatment ordinarily providing homeotropic alignment, in conjunction with a rubbed polymer, or in conjunction with an evaporated inorganic layer such as $MgF_2$.

The defined azimuthal alignment direction at said second cell wall may be provided by an anisotropic photoactive polymer layer.

The grating may be a profiled layer of a photopolymer formed by a photolithographic process e.g. M C Hutley, Diffraction Gratings (Academic Press, London 1982) p 95–125; and F Horn, Physics World, 33 (March 1993). Alternatively, the bigrating may be formed by embossing; M T Gale, J Kane and K Knop, J App. Photo Eng, 4, 2, 41 (1978), or ruling; E G Loewen and R S Wiley, Proc SPIE, 88 (1987), or by transfer from a carrier layer.

The planar surface may be a grating or a rubbed polymer or an anisotropically photopolymerised photopolymer or any other treatment which induces a substantially parallel (or a surface pretilt of typically 2 to 15°) orientation of the nematic director with respect to the surface with a preferred azimuthal direction.

The alignment on one or both walls may be formed by the technique of oblique evaporation of e.g. $MgF_2$ etc.

The electrodes may be formed as a series of row and column electrodes arranged as an x,y matrix of rms. addressable elements or display pixels at electrode intersections. Typically the electrodes are 200 μm wide spaced 20 μm apart. The electrodes may be addressed by row and column driver circuits.

Alternatively, the electrodes may be arranged in other display formats e.g. r-θ matrix or 7 or 8 bar displays.

The cell walls may be substantially rigid plates of glass. Alternatively, one or both walls may be of a flexible material, e.g. a plastics material such as POLYOLEFIN, PET.

The pixels may be addressed by an array of active switching elements, e.g. active matrix elements such as thin film transistors (TFT). In this case the TFT are formed on the surface of one cell wall and switched by e.g. x, y electrodes on the same cell wall; the second cell wall has formed thereon a single sheet or common plate electrode. One of these x,y electrodes is shaped into a pixel shape.

The means for distinguishing between two different optical states may be polarisers. Alternatively the means may be a small amount, e.g 1 to 5% of a dichroic dye included in the liquid crystal material together with one or two polarisers. Typical dyes are 2–4% of D102 (Merck), and about 4% of D6 (Merck).

Small amounts of a chiral dopant or cholesteric liquid crystal material, eg about 3% of C15 (Merck), may be added to the nematic liquid crystal material to impart a preferred twist direction.

The principle of operation is as follows. When a field is applied to the cell, the negative nematic material is forced to reduce its tilt angle until virtually the entire cell thickness is in a planar low tilt state with no twist. When the field is further increased, the planar configuration is forced closer to the homeotropic surface until the liquid crystal begins to interact with the alignment direction that is contained within the homeotropic surface. If this alignment direction is non parallel to the alignment direction of the opposite planar surface then this interaction will lead to twist. With suitable arrangements of polarisers, this twisting is accompanied by a change in optical transmission and hence the device acts as an optical switch.

The planar non twisted (off) state will appear dark if crossed polarisers are oriented parallel and perpendicular to the planar alignment direction. Furthermore this state appears dark when viewed from any direction. The twisted (on) state will appear bright. Therefore this display mode will possess a high contrast regardless of viewing direction: Also the 'off' to 'on' switching event occurs with minimal change in liquid crystal tilt angle therefore the capacitance does not undergo a large change.

BRIEF DESCRIPTION OF THE DRAWINGS

The invention will now be described, by way of example only with reference to the accompanying drawings of which;

FIGS 5(a)–(c) show the principle of the device operation;

FIG. 10 shows the switching times as a function of liquid crystal material layer thickness.

DETAILED DISCUSSION OF PREFERRED EMBODIMENTS

Figure 1:
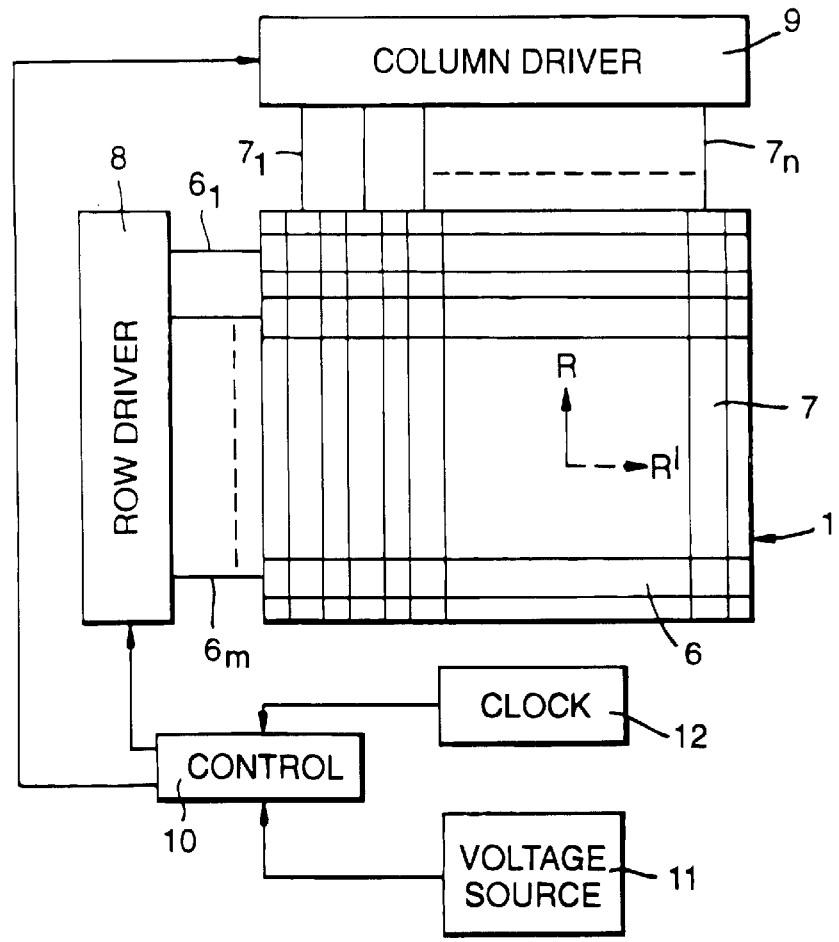
FIG. 1 is a plan view of a matrix multiplexed addressed liquid crystal display.
Figure 2:
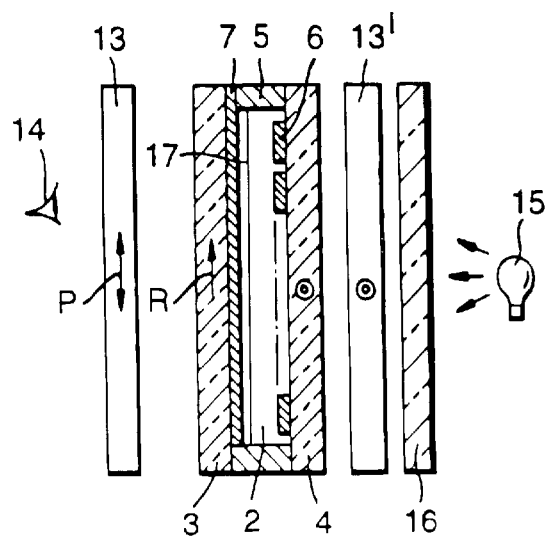
FIG. 2 is the cross section of the display of FIG. 1.

The display in FIGS. 1, 2 comprises a liquid crystal cell 1 formed by a layer 2 of nematic or long pitch (e.g. pitch greater than about four time layer thickness) cholesteric liquid crystal material contained between glass walls 3, 4. A spacer ring 5 maintains the wails typically 1–6 μm apart. Additionally numerous beads of the same dimensions may be dispersed within the liquid crystal to maintain an, accurate wall spacing. Strip like row electrodes 6 e.g. of $SnO_2$ or ITO are formed on one wall 3 and similar column electrodes 7 are formed on the other wall 4. With m-row and n-column electrodes this forms an mxn matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarisers 13, 13' arranged with their polarisation axis P substantially crossed with respect to one another and substantially parallel to the alignment directions R, if any, on the adjacent wall 3, 4 as described later. Additionally a compensation layer of e.g. stretched polymer may be added adjacent to the liquid crystal layer.

A partly reflecting mirror 16 may be arranged behind the cell 1 together with a light source 15. These allow the display to be seen in reflection and lit from behind in dull ambient lighting. For a transmission device, the mirror may be omitted.

Prior to assembly, one of the cell walls e.g. wall 3, is provide with a grating structure 17 to give both an alignment direction and a homeotropic orientation. The other cell wall 4 is surface treated to give a planar surface with a preferred alignment direction.

Finally the cell is filled with a nematic material which may be e.g. EN38 (Chisso) or ZLI-4788 (Merck).

Figure 3:
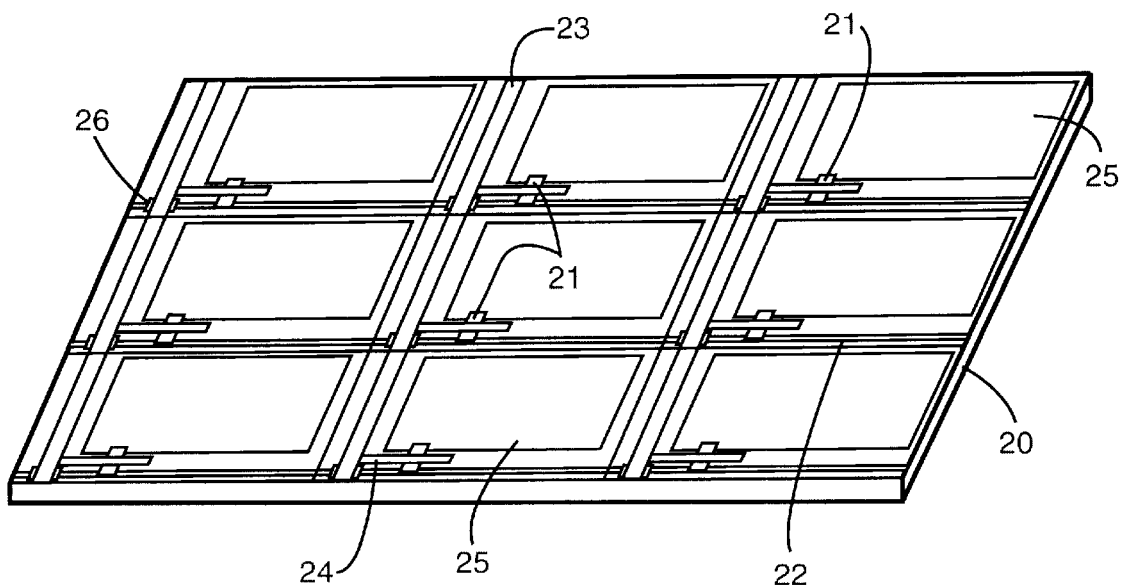
FIG. 3 shows a schematic view of one cell wall carrying a matrix of thin film transistors, and two sets orthogonal addressing electrodes, with pixels formed by pixel electrodes.
Figure 4:
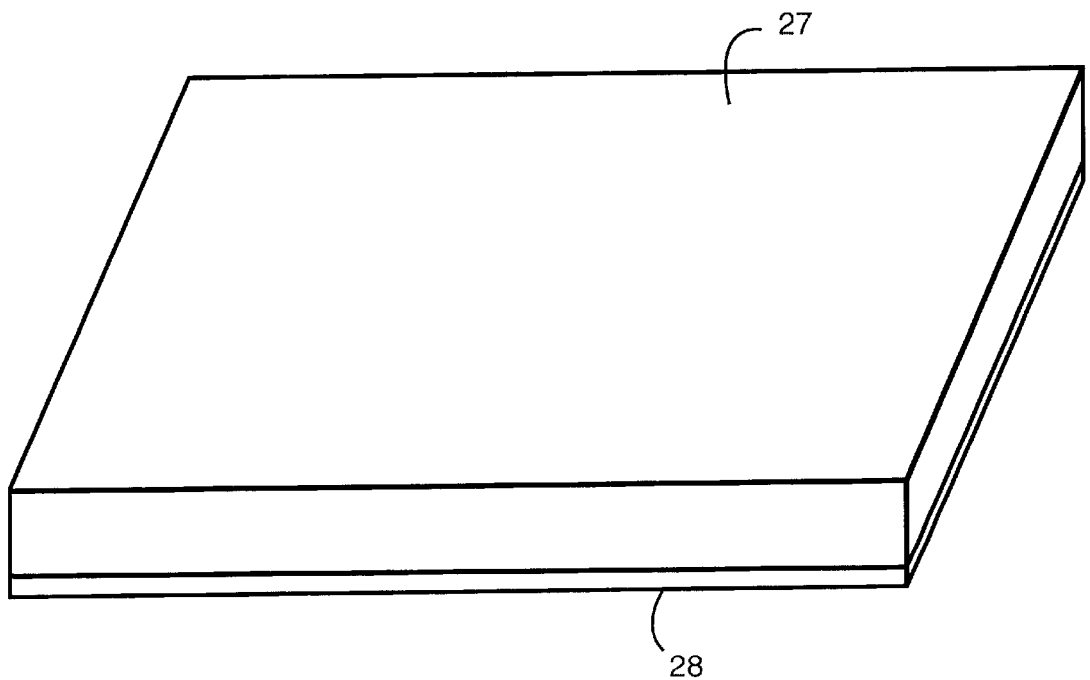
FIG. 4 is a schematic view of the second wall with a sheet electrode, for use with the cell wall of FIG. 3.

FIGS. 3, 4 show an active matrix type of display in which one cell wall 20 carries an array of thin film transistors 21 each connected to one of a source line (row) electrode 22 and a gate line (column) 23 electrode; each gate line has an extension 24 which extends over to form a part of each TFT 21. Associated with each TFT is a pixel electrode 25. Small electrical insulators 26 at each junction of source and gate electrodes provide isolation between source and gate electrodes. The application of a voltage along a gate electrode connects each pixel electrode 25 to its associated source electrode thereby charging the material under the pixel electrode. The second cell wall 27 carries a sheet like common electrode 28 which connects to earth potential. The row and column drivers 8, 9 of FIG. 1 connect to the source and gate electrodes of FIG. 3.

The device is caused to display information by switching selected pixels to an ON state on a background of OFF pixels (or visa versa). A pixel is switched to ON by switching a selected pixel TFT to a conducting condition. This causes a voltage to appear on the associated pixel electrode 25 which remains until the voltage is discharged by switching the TFT to ON whilst connecting the source electrode 22 to earth potential. When in the ON state the liquid crystal material, pixel electrode 25 and common electrode 28 form a capacitor which holds its charge until discharge to earth; hence a need for a liquid crystal material having a reasonably constant capacitance in its switched and unswitched states.

EXAMPLE 1

The grating on wall 3 was fabricated into Shipley 1805 photoresist by contact photolithography using a chrome on glass mask with a pitch of 1 $\mu$m (0.5 $\mu$m lines, 0.5 $\mu$m gaps). Adjustment of the exposure time allowed different groove depths to be obtained. In this case a mercury lamp source was used with an-intensity of 0.5 mW/cm$^2$. Development was carried out in Shipley MF319 for 10 seconds followed by a water rinse. Finally the grating was exposed to deep UV and baked at 160° C. to ensure insolubility in the liquid crystal. Prior to cell construction, the grating surface was treated with a lecithin solution in order to induce a homeotropic surface.

The alignment on wall 4 consisted of a rubbed layer of PI32 (Ciba Geigy) or a polyimide. This rubbing gives both an alignment direction and a surface pretilt, e.g. of 2 to 10°.

The principle of operation is now described with reference to FIG. 5.

The top surface (A) (wall 4) can be any treatment which induces a pretilted planar alignment (in the x direction) while the lower surface (B) (wall 3) is a grating surface coated with a surfactant to induce a homeotropic orientation. The grating grooves point in the y direction. At voltage V=0, a hybrid director profile exists as shown in FIG. 5$a$. When the voltage is raised to $V_1$, the tilt of the nematic (with $\Delta\epsilon<0$) lowers throughout the thickness of the cell except close to the grating surface where it remains high due to the homeotropic treatment FIG. 5$b$. At a higher voltage ($V_2$), the nematic very close to (or even within) the grating grooves is driven into a planar orientation FIG. 5$c$. Once this occurs, the director near the surface will encounter the azimuthal anchoring force of the grating 17 and will twist around to follow the groove direction (y axis). Thus a twisted structure is formed.

The two states are made optically distinct by placing the cell between crossed polarisers (FIGS. 1, 2) with their transmission axes along the x and y directions. In this case, the configurations at V=0 and $V_1$ will appear black while at $V_2$ a light state is observed.

As with conventional TN structures, the maximum transmission is obtained when N is an integer where;

$$N=\sqrt{(\Delta nd/\lambda)^2+0.25}$$

where $\Delta$n is the nematic birefringence, d is the cell gap and $\lambda$ is the operating wavelength. Similarly a normally black mode can be obtained by using parallel polarisers along either the x or y direction.

The optical contrast is obtained using voltages between $V_1$ and $V_2$. In this range the nematic director is substantially planar and so the black and white states as well as intermediate grey levels are obtained with improved and symmetric viewing angle characteristics. Variation of the grating groove depth influences the voltage at which the transition to a twisted state occurs. A higher transition voltage is preferred to ensure a fully planar structure. Several experiments have been carried out as described below.

One cell was made using a grating surface which was formed from a 100 seconds exposure. This 10 $\mu$m thick cell was filled with EN38 (Chisso) and optical observation confirmed that the zero volts state was splayed as in FIG. 5. Eye response transmission was then measured with the cell between crossed polarisers and capacitance data was also taken.

Figure 6:
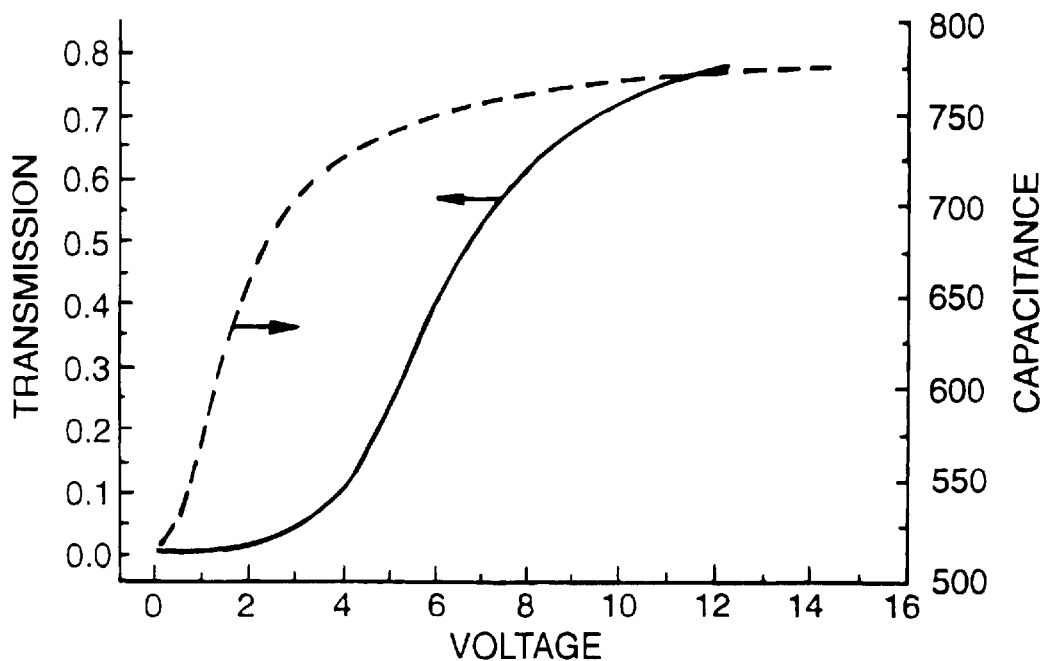
FIG. 6 shows the transmission (solid line) and capacitance (dotted line) as a function of voltage for the device cell.

FIG. 6 (solid line) shows that the transmission at V=0 is low. At about 4V it begins to rise which corresponds to the transition between the V=$V_1$ and V=$V_2$ configurations in FIG. 5. Furthermore the results clearly show that the capacitance (broken line) has almost fully saturated before the transmission begins to rise. Hence it can be concluded that the majority of the cell thickness is planar before the twist deformation occurs. Thus the greyscale in the VCT is mainly due to a voltage controlled twist and so a good viewing characteristic will be obtained. The data also shows that optical switching can occur with only small changes in capacitance.

Figure 7:
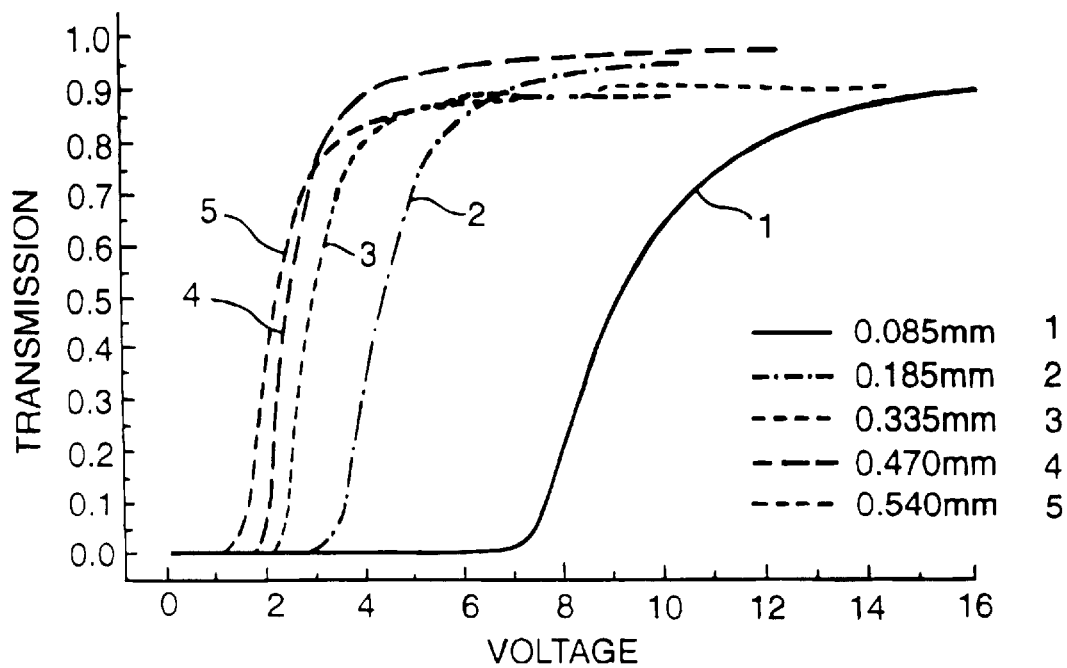
FIG. 7 shows the transmission of the device as a function of voltage for several different grating groove depths.

In the next experiment several cells were fabricated using gratings formed with different exposure time to test the effect of groove depth on the switching response. The cells had a gap of 5 $\mu$m and were filled with EN38. FIG. 7 shows the optical transmission of these cells as a function of voltage. The quoted groove depths were measured using tapping mode AFM (atomic force microscopy). The curves clearly show that the optical threshold is very sensitive to the grating groove depth with deeper grooves (longer exposures) leading to a threshold at a lower voltage. In all cases, high contrast switching is obtained (>200:1). The curves with lower voltage thresholds also show optical responses which are steeper than typical 90° TN devices.

Operation of the device can be considered as follows. The change in twist threshold voltage cannot be attributed to the extent to which the grating grooves extend into the cell as the groove depth in the above samples has only been varied between 0.085 $\mu$m and 0.54 $\mu$m, both of which are small compared to the cell gap (5 $\mu$m). Instead, we need to consider the size and extent of the distortion of the nematic above the grating surface.

The grating surface imposes an azimuthal anchoring energy (W$\phi$) which forces the nematic director to lie parallel to the grating grooves which is given by (D. W. Berreman, Mol.Cryst. Liq. Cryst. V. 23, P.215 (1973));

$$W_\phi \propto \frac{a^2}{L^3}$$

where a is the groove depth and L is the grating pitch. W$\phi$ is the total energy per unit area integrated in the z direction to infinity. The decay length in the z direction will be proportional to the grating pitch and almost independent of the grating groove depth. Therefore separate adjustment of a and L allow independent adjustment of the anchoring energy as well as its distribution.

Equation 1 was derived for a system with planar anchoring of the nematic on the grating surface. In the VCT cell, the anchoring is homeotropic and so Wφ is zero. A non zero value for Wφ only occurs when a field is applied to the cell as this forces the director into a planar orientation near the grating surface. As the voltage is increased the planar orientation is forced closer to the grating surface and so Wφ increases. The twist threshold will occur when;

$$W_\phi(V) > W_t$$

where $W_t$ is the twist threshold energy. It is clear from the above argument that smaller groove depths or larger groove pitches are preferred to keep Wφ small until the nematic is planar throughout the majority of the cell thickness thus leading to wider viewing characteristics.

Considering the presented data, the curves in FIG. 7 share a common capacitance curve (FIG. 6) as this mainly independent of groove depth. Thus the cells with shallower gratings (0.085 μm and 0.185 μm) consist of a substantially planar structure when the optical transmission begins to rise. They are therefore expected to have better viewing characteristics than the cells made with deeper gratings. The viewing characteristics were measured for two VCT cells, one with shallow grooves and one with deep grooves.

Figure 8:
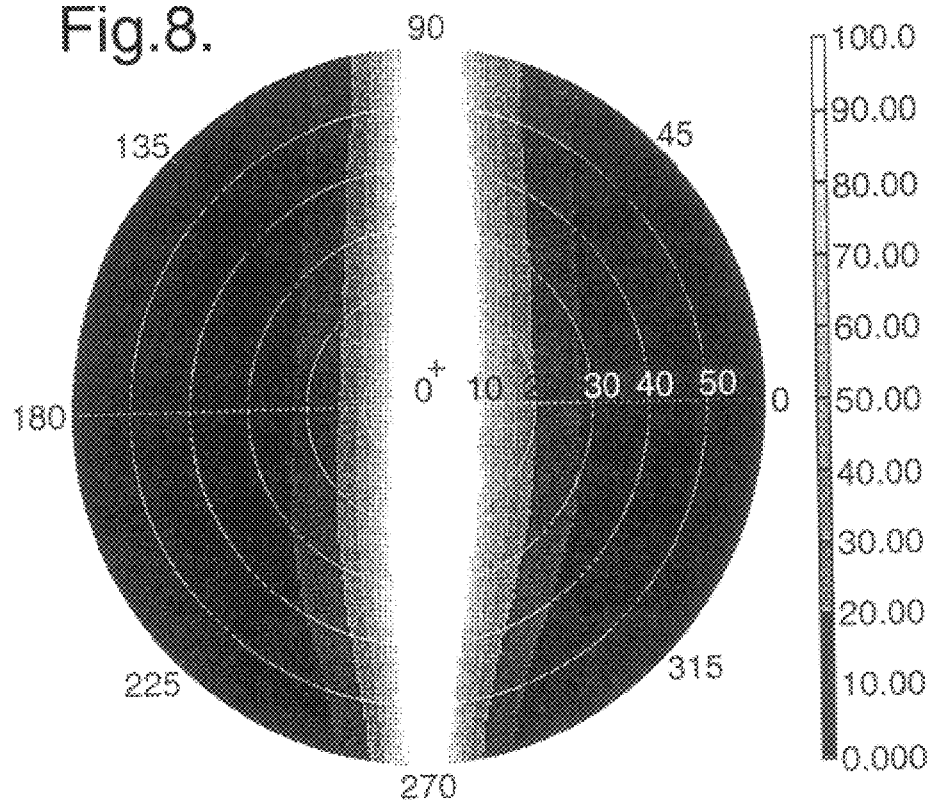
FIG. 8 shows the contrast ratio as a function of viewing orientation for a cell with deep grating grooves.
Figure 9:
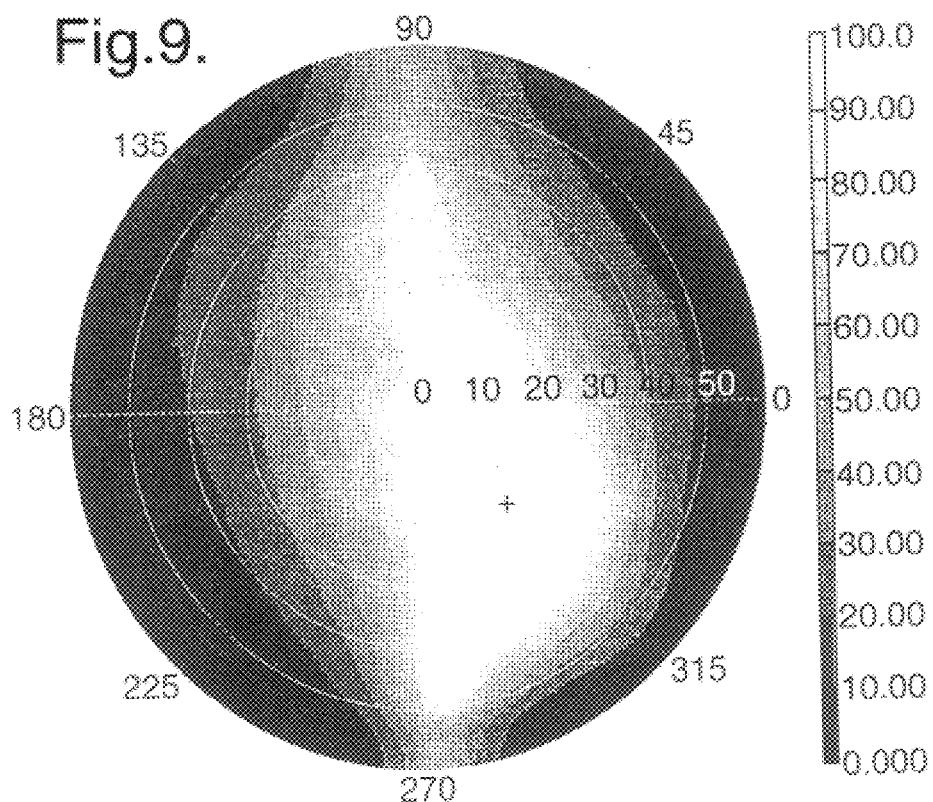
FIG. 9 shows the contrast ratio as a function of viewing orientation for a cell with deep grating grooves.

FIG. 8 shows the contrast ratio as a function of viewing orientation for the cell with deep grating grooves (0.4 μm). The two data sets used to calculate the contrast were recorded at 15V and at the threshold voltage. Good viewing characteristics are observed in the vertical direction but the contrast falls off quickly in the horizontal direction. Indeed by about ±20°, the contrast inless than 10:1. A second set of viewing data are shown in FIG. 9 for a cell with shallow grating grooves (0.1 μm). In this case the viewing characteristics are much better with virtually the entire viewing cone having a contrast of >10:1. Comparison of FIG. 9 and FIG. 8 confirms that better viewing characteristics are obtained from VCT cells with shallower grooves.

The response times of the VCT switching were measured as a function of cell thickness. The results are shown in FIG. 10. The switching times were measured for a 0 to 15 V switch. The switch-on time was fitted with an exponent of 1.494 while the switch-off time has an exponent of 2.241. These are respectively less than and greater than the quadratic power law which is measured for both the ON and OFF times in a TN device. The fastest times recorded for the VCT at room temperature were 29 ms ($t_{on}$) and 18 ms ($t_{off}$). These are similar to typical TN devices.

Figure 11A:
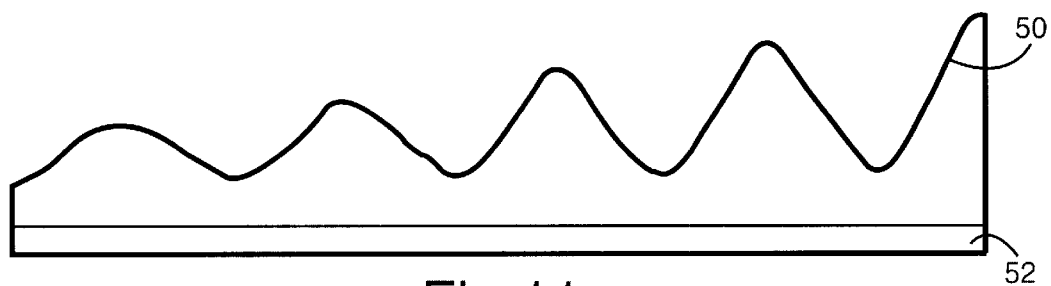
FIGS 11a to 11d show various types of surface alignment gratings.
Figure 11B:
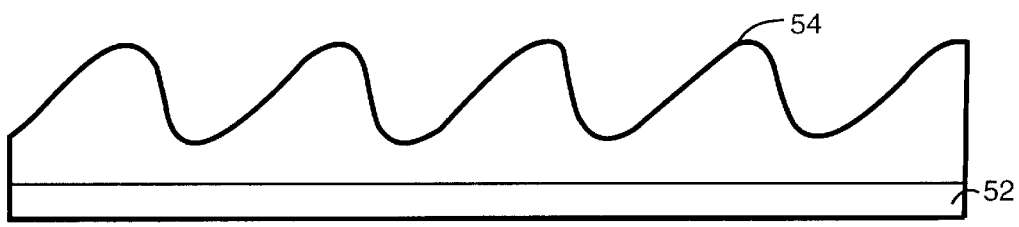
Figure 11C:
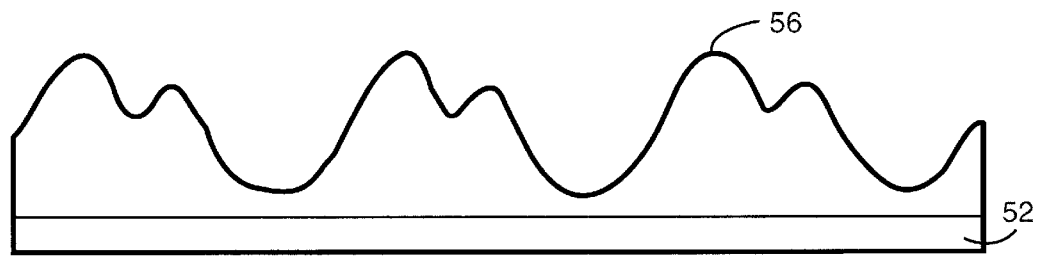
Figure 11D:
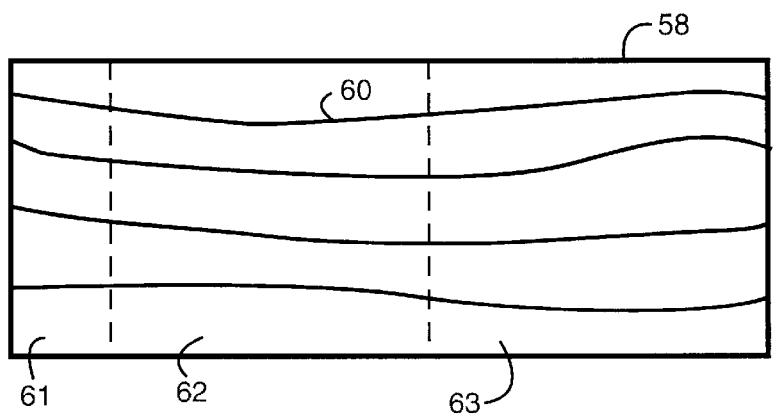

FIGS. 11a–11d show various grating structures that can be used in the present invention. FIG. 11a shows a cross-sectional view of a grating 50 on a substrate 52, the amplitude of which varies across a plurality of pixels or within a pixel. FIG. 11b shows a cross-sectional view of an asymmetric grating profile 54 on a substrate 52. FIG. 11c shows a cross-sectional view of a grating 56 on a substrate 52 having more than one modulation. FIG. 11d shows a perspective view of a section of grating structure 58 having a variation in groove direction across a plurality of pixels 61, 62, 63; the contour lines 60 indicate the ridges of the grating peaks.

In summary the above results show that the VCT mode offers a steep optical response with a low capacitance change, good viewing characteristics with reasonable switching speeds. The above cells did show reverse twist disclinations but these can easily be removed by adding a small amount of chiral dopant to the nematic or by ensuring that groove direction on the homeotropic surface is not orthogonal to the anchoring direction on the planar surface. The grating profile may be optimised to achieve the steepest optical response with good viewing properties by the use of asymmetric groove profiles or surfaces containing more than one modulation. Tests have shown that a large asymmetry in the groove profile totally inhibits the twist threshold despite the groove depth and pitch being similar to the cells described above.

Typical values for the a and L are 0.3 μand 1.0 μm in the range of about 0.05 μm to 5 μm and 0.10 to 10 μm respectively.

EXAMPLE 2

A VCT device can also be made in which the homeotropic surface is a rubbed polymer overcoated with a surfactant. One such device was made as follows. The polyimide material AL5417 (JSR) was spin coated onto ITO coated glass, baked for 1 hour at 180° C. and rubbed. Next a lecithin solution (0.1% by weight in isopropanol) was placed on the polyimide surface and left for 60 seconds before removal by spinning. This surface was then constructed into a cell in which the opposite surface was a rubbed polyimide (AL5417) without a lecithin treatment. The rubbing directions were orthogonal to each other and the cell thickness was 6 μm. The cell was filled with EN38 (Chisso) in its isotropic phase followed by cooling to room temperature.

The cell was positioned with crossed polarisers along the rubbing directions. When a voltage was applied, the transmission remained low until a voltage of 6.5 V was reached. Above 6.5 V, the transmission increased and eventually saturated at about 15 V. This cell was found to have a good viewing angle and only exhibited a small change in capacitance above 6.5 V.

What is claimed is:

1. A liquid crystal display device comprising:
   (a) a layer of nematic liquid crystal material having a negative dielectric anisotropy disposed between a first cell wall and a second cell wall;
   (b) said first cell wall having a first planar surface alignment treatment providing a single first azimuthal surface alignment direction to said layer of nematic liquid crystal material in the presence and absence of an imposed electric field;
   (c) said second cell wall having a second surface alignment treatment providing a second defined azimuthal surface alignment direction to said layer of nematic liquid crystal material when an electric field is imposed and a substantially homeotropic surface alignment direction to said layer of nematic liquid crystal material in the absence of an imposed electric field;
   (d) means for distinguishing between differing optical states; and
   (e) electrodes disposed on said first cell wall and said second cell wall so as to impose an electric field on said layer of liquid crystal material, wherein said surface alignment direction of said liquid crystal material at said second surface is dependent upon a magnitude of said imposed electric field such that said layer of liquid crystal material varies between substantially untwisted and substantially twisted molecular configurations.

2. The device of claim 1, wherein the two azimuthal alignment directions are within 10° of being perpendicular.

3. The device of claim 1, wherein the aligning surface treatment on the second cell wall includes a grating structure.

4. The device of claim 1, wherein the aligning surface treatment on the second cell wall includes a rubbed polymer.

5. The device of claim 1, and further including an active matrix of switching elements on one containing wall.

6. The device of claim 1, wherein the means for distinguishing between two different optical states comprises two polarising films aligned such that their axes are substantially crossed.

7. The device of claim 1, wherein the means for distinguishing between two different optical states includes a dichroic dye and at least one polariser.

8. The device of claim 3, wherein groove direction on the grating surface is constant between pixels.

9. The device of claim 3, wherein the grating has an asymmetric groove profile.

10. A liquid crystal display device in accordance with claim 1, wherein said nematic liquid crystal material comprises a chiral nematic liquid crystal material having a preferred twist direction.

11. A liquid crystal display device in accordance with claim 1, wherein said nematic liquid crystal material comprises a nematic liquid crystal material having no preferred twist direction.

12. A liquid crystal display device comprising:
    (a) a layer of nematic liquid crystal material having a negative dielectric anisotropy disposed between a first cell wall and a second cell wall;
    (b) said first cell wall having a first planar surface alignment treatment providing a single first azimuthal surface alignment direction to said layer of nematic liquid crystal material;
    (c) said second cell wall having a second surface alignment treatment providing a second defined azimuthal surface alignment direction to said layer of nematic liquid crystal material when an electric field is imposed and a substantially homoetropic surface alignment direction to said layer of nematic liquid crystal material in the absence of an imposed electric field;
    (d) means for distinguishing between differing optical states; and
    (e) electrodes disposed on said first cell wall and said second cell wall so as to impose an electric field on said layer of liquid crystal material, wherein said surface alignment direction of said liquid crystal material at said second surface is dependent upon a magnitude of said imposed electric field such that said layer of liquid crystal material varies between substantially untwisted and substantially twisted molecular configurations, wherein the aligning surface treatment on the second cell wall includes an anisotropic photoactive polymer layer.

13. A liquid crystal display device comprising:
    (a) a layer of nematic liquid crystal material having a negative dielectric anisotropy disposed between a first cell wall and a second cell wall;
    (b) said first cell wall having a first planar surface alignment treatment providing a single first azimuthal surface alignment direction to said layer of nematic liquid crystal material;
    (c) said second cell wall having a second surface alignment treatment providing a second defined azimuthal surface alignment direction to said layer of nematic liquid crystal material when an electric field is imposed and a substantially homoetropic surface alignment direction to said layer of nematic liquid crystal material in the absence of an imposed electric field, wherein die aligning surface treatment on the second cell wall includes a grating structure;
    (d) means for distinguishing between differing optical states, and
    (e) electrodes disposed on said first cell wall and said second cell wall so as to impose an electric field on said layer of liquid crystal material, wherein said surface alignment direction of said liquid crystal material at said second surface is dependent upon a magnitude of said imposed electric field such that said layer of liquid crystal material varies between substantially untwisted and substantially twisted molecular configurations, wherein the shape of the grating surface varies between pixels.

14. A liquid crystal display device comprising:
    (a) a layer of nematic liquid crystal material having a negative dielectric anisotropy disposed between a first cell wall and a second cell wall;
    (b) said first cell wall having a first planar surface alignment treatment providing a single first azimuthal surface alignment direction to said layer of nematic liquid crystal material;
    (c) said second cell wall having a second surface alignment treatment providing a second defined azimuthal surface alignment direction to said layer of nematic liquid crystal material when an electric field is imposed and a substantially homoetropic surface alignment direction to said layer of nematic liquid crystal material in the absence of an imposed electric field, wherein the aligning surface treatment on the second cell wall includes a grating structure;
    (d) means for distinguishing between differing optical states; and
    (e) electrodes disposed on said first cell wall and said second cell wall so as to impose an electric field on said layer of liquid crystal material, wherein said surface alignment direction of said liquid crystal material at said second surface is dependent upon a magnitude of said imposed electric field such that said layer of liquid crystal material varies between substantially untwisted and substantially twisted molecular configurations, where the grating contains more than one modulation.

* * * * *